Figure 1:
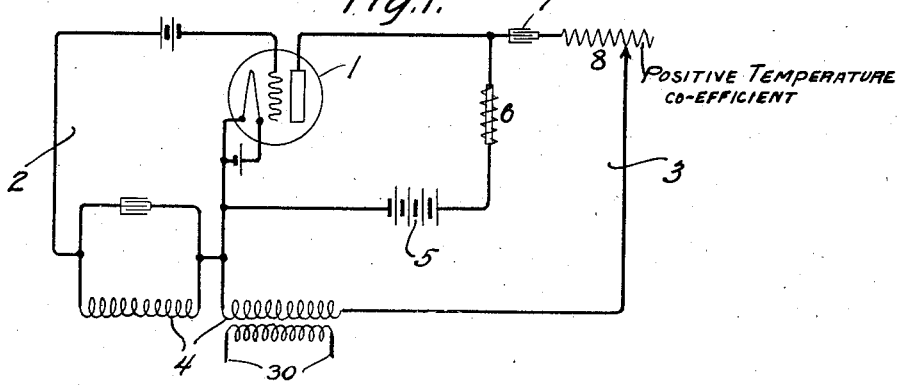

Dec. 1, 1925.

W. S. GORTON 1,563,620

OSCILLATION GENERATOR

Filed May 4, 1921   2 Sheets-Sheet 1

Inventor:
William S. Gorton,
by C. A. Sprague.
Att'y

Inventor:
William S. Gorton,
by C. A. Sprague Atty.

Patented Dec. 1, 1925.

1,563,620

UNITED STATES PATENT OFFICE.

WILLIAM S. GORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

OSCILLATION GENERATOR.

Application filed May 4, 1921. Serial No. 466,660.

*To all whom it may concern:*

Be it known that I, WILLIAM S. GORTON, a citizen of the United States of America, residing at East Orange, in the county of Essex, State of New Jersey, have invented certain new and useful Improvements in Oscillation Generators, of which the following is a full, clear, concise, and exact description.

This invention relates to oscillation generators, and more particularly to a method of and means for automatically controlling the electrical conditions in the circuit system associated with a three-element vacuum tube device adapted to produce electrical oscillations.

In an oscillation generator comprising a three-element vacuum tube device, the differential equations expressing the conditions in the circuit are linear when there are only small variations from the condition in which all the currents and electro-motive forces are constants. These equations are developed and their application to this problem will be found in an article describing "The audion as a circuit element" by H. W. Nichols, published in the Physical Review of June 1919, vol. 13, No. 6, pages 404 to 414.

When these equations are solved we obtain terms representing oscillations of certain frequencies and certain damping factors. If any damping factor is less than zero, the variations from the state represented by it due to any disturbance given the system will die out; if the damping factor is zero the oscillations will continue with constant amplitude and if the damping factor is greater than zero the oscillations will persist with a continuously increasing amplitude. As the amplitude finally attained by the oscillations is finite, it is evident that the equations representing the currents, when the variations in them are small, no longer hold when the final amplitude of the oscillations is attained. In this case the differential equations cease to be linear owing to the curvature of the characteristic graph of the tube, and it is this curvature which finally limits the amplitude of the oscillations.

It is only when the differential equations are linear that the type of the variations in the current is the product of a simple harmonic and an exponential term, the total number of such products being equal to the number of degrees of freedom of the system. When the differential equations are not linear, harmonics of the above simple harmonic terms inevitably occur in the solution and consequently, in the actual case where the amplitude of the oscillations is limited by the input voltage-output current characteristic of the tube, harmonics are always present.

If now some device external to the tube is used to maintain the amplitude of the oscillating current at a selected value, the proportion of the harmonics in the oscillating current may be predetermined and maintained constant.

The primary object of this invention is to provide means for maintaining a constant proportion of harmonics in the current produced by an oscillator. Another object is the provision of means for automatically controlling the amplitude of the alternating current produced by an oscillation generator of the vacuum tube type. Still another object is to provide means automatically operating to prevent electrical variations in the circuit system associated with a vacuum tube from affecting the amplitude of the oscillating current generated by the system.

These objects, and others which will appear as the nature of the invention is disclosed, may be accomplished by providing the oscillator with an automatically operated device designed to neutralize the effect of disturbing reactions in its coupled circuits. In accordance with one method contemplated by this invention, a resistor having a high positive temperature coefficient is included in the plate circuit or a circuit coupled thereto, as for instance, the grid circuit if an appreciable current is flowing therethrough. This arrangement has the further advantage that when the oscillations start, the resistance value of the compensating resistance is low and, as a consequence, the amplitude of the oscillations will build up rapidly to the final value.

A second method involves the use of means for automatically regulating the spatial relation of the coils coupling the oscillating current input and output circuits of the tube, so that the output current is maintained constant.

Figure 2:
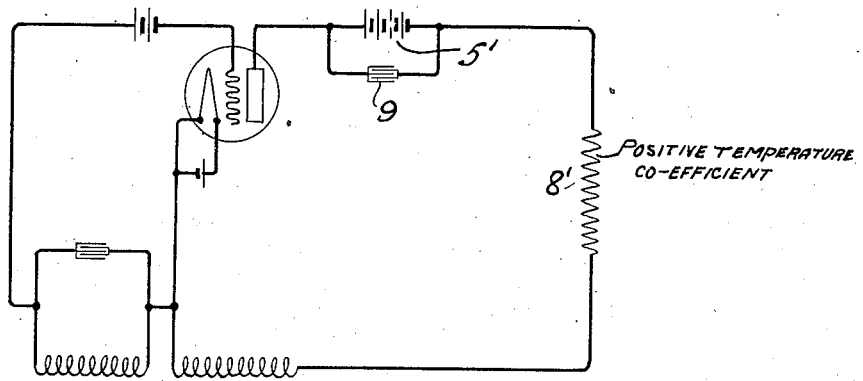
Figure 3:
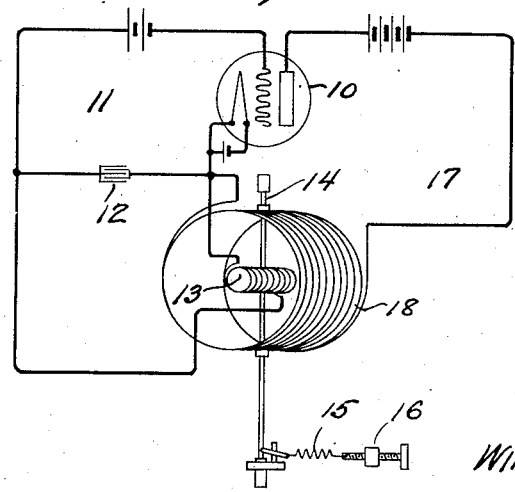
Figure 4:
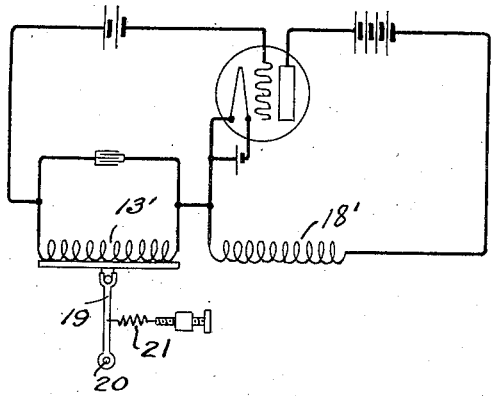
Figure 5:
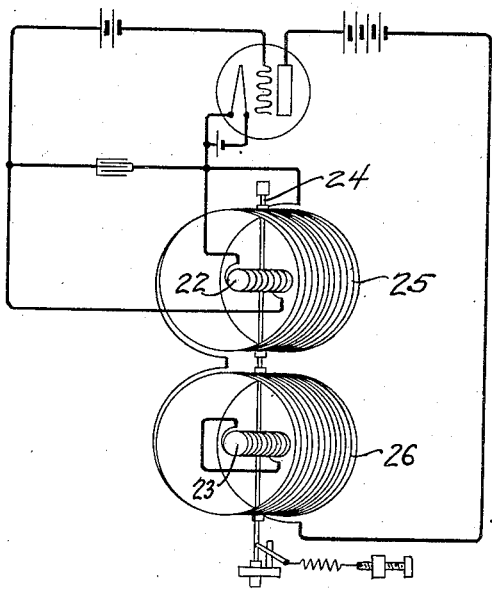
Figure 6:
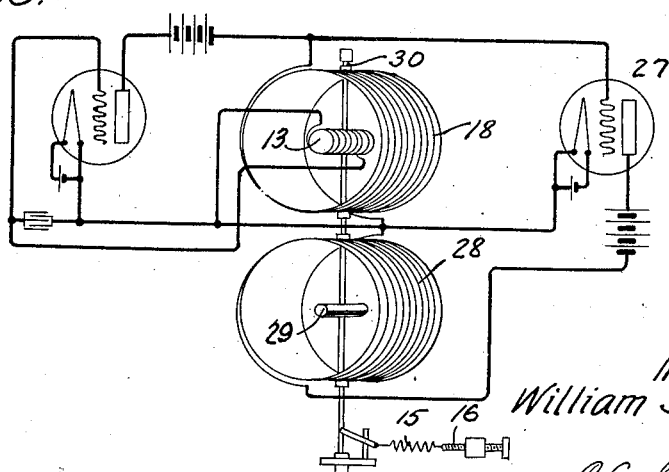

For an understanding of an oscillator operating according to this invention and embodying its features, reference may now be had to the accompanying detailed description taken in connection with the annexed drawings in which Fig. 1 shows one arrangement for generating an alternating current of constant amplitude, Fig. 2 shows a slightly different circuit arrangement for this purpose, Figs. 3 and 4 show two constructions for controlling the mutual inductance of the coupling coils, Fig. 5 shows a slightly different arrangement for this purpose, and Fig. 6 shows a modification of the construction shown in Fig. 5.

Referring to Fig. 1, a vacuum tube oscillator 1 is shown having its alternating current grid circuit 2 and plate circuit 3 coupled in feed-back relation by the transformer 4. The frequency of the oscillations produced is determined in well-known manner by the tuning of the closed circuit including the secondary winding of the transformer 4 and the condenser connected in shunt thereto.

Current is supplied to the plate circuit of the tube by a source 5 through a choke coil 6. As is well known, this choke coil is used to prevent the flow of oscillatory current through the plate source while permitting direct current therefrom to traverse the plate circuit. A condenser 7 included in the oscillating current path of the output circuit is designed to provide a low impedance path for alternating current while preventing the flow of direct current through this path.

Included in the oscillating current path is an adjustable resistor 8 which may consist of a single fine wire or a plurality of such wires in parallel. The material of such wire or wires should have a large positive temperature coefficient of resistance, so that any disturbance tending to cause the current to decrease will be compensated by a reduction in the resistance of the wire or wires constituting the resistor and any tendency of the current to increase in value will be met by a corresponding increase in the resistance of these wires. In this manner the oscillating current will be prevented from departing to any material extent from the value predetermined by the setting of the resistor. By adjusting this resistance the proportion of harmonics present in the plate circuit may be fixed to suit any desired operating requirements. In fact by selecting the amplitude of the plate current so that the tube operates upon the linear portion of the characteristic curve a current substantially free from harmonics may be produced.

The construction shown in Fig. 2 differs from that shown in Fig. 1 merely in that both the direct and oscillating plate currents flow through a single path including the resistor 8'. In other respects the circuits are identical with those described in Fig. 1. A condenser 9, designed to provide a low impedance path for the oscillations, may be connected in shunt to the direct current plate source 5'.

This arrangement is more sensitive than that shown in Fig. 1, because, owing to the greater value of the current normally traversing the resistor, and since the heating effect is proportionate to the square of the current, relatively small changes in the value of the alternating current will produce greater changes in the resistance value of the wires, other things being equal.

The arrangements shown in Figs. 3 and 4 depend for their operation upon the flow of a sufficiently large current in the grid circuit of the tubes, and the restoration of the plate current to predetermined value by varying the mutual inductance between the coupling coils when the amplitude of the plate current changes.

Referring now to Fig. 3, the three-element vacuum tube 10 has included in its input circuit 11, a tuned circuit consisting of the condenser 12 and inductance 13, which determines the frequency of the oscillating current generated. Coil 13 is mounted upon a rotary spindle 14 secured to one end of a control spring 15 the other end of which is connected to the frame or casing by an adjusting device 16, whereby the tension of the spring 15 may be regulated. The output circuit 17 includes a stationary coil 18 at the center of which the coil 13 included in the input circuit is supported. The mechanical force between the coils 13 and 18 due to the currents flowing through them will tend to reduce their mutual inductance, but will be opposed by the spring 15. The amplitude of the oscillatory current may therefore be determined by the tension of the control spring 15. Hence, by adjusting this spring so that when a current of selected value is flowing through the coil 18, the mechanical force between the coils and the opposing force of the spring are balanced, any change in the value of the current from that determined by the adjustment of the spring will produce an unbalanced condition of the forces applied to the movable coil 13 and the latter will be rotated until equilibrium is restored.

Fig. 4 shows an arrangement which differs from the construction shown in Fig. 3 only by the means employed for associating the coupling coils of the oscillator. In this construction the movable coil 13' of the oscillator is secured to an arm 19 fulcrumed at the point 20, which is controlled by an adjustable balancing means, as for example a regulable spring 21. As described with reference to the preceding figure, by setting the control spring 21 to secure a balanced condition when an oscillating current of desired amplitude is flowing in the plate circuit, any variation of current from this value will cause the mutual impedance of the coupling coils 13' and 18' of the oscillator to change. Consequently, the movable coil 13' will be adjusted to a position in which the mechanical forces applied thereto by the interaction of the coils and the spring 21 will be balanced.

When the current flowing in the grid circuit is insufficient to supply the necessary mechanical force between the coupling coils of the oscillator a separate means must be provided for this purpose. This may be done by including in the plate circuit an auxiliary coil inductively associated with a short-circuited coil supported at the center of the auxiliary coil by a spring controlled spindle of the type shown in Fig. 3, which also carries the movable coupling coil.

As shown in Fig. 5, the movable coils 22 and 23 are mounted on the spring controlled spindle 24. The former is supported at the center of the coil 25 and the latter at the center of the coil 26. Coils 25 and 26 are included in the plate circuit, and hence are energized by the current traversing this circuit. Coils 22 and 25 constitue the feed-back coupling between the input and output circuits of the tube.

Current flowing in the auxiliary coil 26 will set up an induced current in the coil 23, which is short-circuited, and the mutual inductance between these coils will tend to rotate the spindle to vary the coupling between coils 22 and 25. This tendency is opposed by the spring controlling the spindle 24. As described above, the control spring may be adjusted to balance the opposing forces applied to the spindle for any selected amplitude of the plate current and any disturbance tending to cause variation of the current flowing through the plate circuit will be compensated by movement of the spindle 24 and hence of the movable coil 22.

An alternative scheme for securing variation in the mutual impedance in the plate-grid circuit pair of coils, in the case of insufficient current in the grid circuit, is shown in Fig. 6. In this figure the coupling between the input and output circuit coils of the oscillator is the same as that shown in Fig. 3. The plate circuit of the oscillator is coupled to the input circuit of a vacuum tube device 27 having good amplifying characteristics. Included in the plate circuit of the tube 27 is a coil 28 having an iron core 29 supported at its center by the spring controlled spindle 30, which also carries the movable coil 13 of the oscillator feed-back coupling. A hereinbefore described the spring 15 controlling the spindle 30 is provided with a tension adjusting means 16.

There will flow in the plate circuit of the tube 27 a direct current the magnitude of which is dependent upon both the plate and the average grid potentials and also the alternating currents produced by the oscillating tube. These currents magnetize the iron core 29, thus causing it to assume a position of equilibrium depending only upon the magnitude of these currents and the tension of the spring 15 controlling the spindle. Any variation of the value of the current in the plate circuit of the oscillator will cause an unbalanced condition of the forces applied to the spindle 30 by its control spring 15 and the coil-core combination 28—29. This will result in the mutual inductances of the plate-grid circuit pair of coils of the oscillator being adjusted to restore the amplitude of the alternating current to the value determined by the setting of the control spring.

In a generator of this type variations of the mutual inductance of the coupling coils due to disturbances are relatively small, and hence, with a loose coupling between the input and output circuits of the tube, these variations will not exert an appreciable effect upon the frequency of the current supplied by the generator. Obviously a load circuit would be coupled to the output coupling coil as shown in Fgs. 1 and 2 at 30.

The preceding description has been given merely with the object of clearly and completely disclosing the nature of the invention, the principles of which are independent of the specific details and elements shown. Briefly stated, the invention essentially depends upon the use of means associated with the coupled circuits of an oscillating electric discharge device which predetermines the electrical characteristics of the coupled circuits, is sensitive to any variations in the predetermined characteristics, and is automatically effective over a substantial operating range for compensating or neutralizing variations in the predetermined characteristics, whereby an oscillating current of selected value having a predetermined proportion of harmonics may be supplied by the generator. It is therefore to be understood that this invention is not limited to the arrangements herein shown and described, but only by the scope of the appended claims.

What is claimed is:

1. The method of operating an oscillation generator comprising an electric discharge device having coupled input and output circuits, which comprises determining the electrical characteristics of the coupled circuits, and substantially neutralizing any variations in said characteristics.

2. The method of operating an oscillation generator comprising an electric discharge device having coupled input and output circuits, which comprises determining the amplitude of the oscillating current generated, and substantially neutralizing any variations in the amplitude of said current.

3. The method of operating an oscillation generator comprising an electric discharge device having coupled input and output circuits, which comprises determining the amplitude of the oscillating current flowing in the output circuit and compensating variations in the amplitude of said current, whereby a potential of predetermined substantially constant value is impressed upon the input circuit.

4. The method of operating an oscillation generator comprising an electric discharge device having coupled input and output circuits, which comprises determining the amplitude of the oscillating current and substantially neutralizing any variations in the amplitude of said oscillating current, whereby the proportion of harmonics present in the oscillating current produced may be definitely fixed.

5. The method of operating an electric discharge device having coupled input and output circuits and a tuned circuit which comprises determining the amplitude of the oscillating current generated and substantially neutralizing the effect of any variations in the amplitude of said current due to disturbing reactions, whereby oscillating current of constant amplitude may be produced in the tuned circuit.

6. An oscillation generator comprising an electric discharge device having coupled input and output circuits including a resonant circuit, said coupled circuits having means sensitive to electrical variations which is effective over the operating range for substantially preventing variations due to disturbing reactions from affecting said resonant circuit.

7. An oscillation generator comprising an electric discharge device having coupled input and output circuits including means sensitive to electrical variations for predetermining the electrical characteristics of said coupled circuits and automatically operative to substantially prevent variations in the predetermined characteristics of said circuits.

8. An oscillation generator comprising an electric discharge device having coupled input and output circuits including means to predetermine the amplitude of the oscillating current produced by the generator, and also automatically operative to substantially compensate variations in the amplitude of said current.

9. An oscillation generator comprising an electric discharge device having coupled input and output circuits including means operative over a finite range for substantially compensating fluctuations, in the current produced by the generator, which are caused by disturbing reactions.

10. An oscillation generator comprising an electric discharge device having coupled input and output circuits including means operative over a substantial range and controlled by changing current conditions in said output circuit for substantially compensating said current changes, whereby a current of constant amplitude is produced by the generator.

11. An oscillation generator comprising an electric discharge device having coupled input and output circuits including means to predetermine the amplitude of the current produced by the generator and effective over an operative range to automatically and substantially compensate variations in the amplitude of the current generated.

12. An oscillation generator comprising an electric discharge device having coupled input and output circuits including means for predetermining the amplitude of the current traversing the output circuit and effective over a current range for automatically and substantially compensating any variations in said output circuit, whereby a potential of selected value is impressed upon said input circuit.

13. An oscillation generator comprising an electric discharge device having coupled input and output circuits, and a resistance included in said output circuit which is sensitive to current variations and is adapted to substantially compensate variations in the amplitude of the current generated.

14. An oscillation generator comprising an electric discharge device having coupled input and output circuits, and a resistance having a positive temperature coefficient included in said output circuit which substantially compensates variations in the amplitude of the current generated.

15. An electric discharge device having a cathode, an anode and a control electrode, circuits connecting said electrodes in pairs, and means included in one of said circuits for predetermining its characteristics for alternating current and also for automatically and substantially compensating variations in said predetermined characteristics.

16. An electric discharge device having a cathode, an anode and a control electrode, circuits respectively connecting said anode and control electrode to said cathode, and means included in one of said circuits for predetermining its characteristics for alternating current and for automatically and substantially compensating variations in said predetermined characteristics.

17. An electric discharge device having a cathode and an anode, a circuit connecting said electrodes including means for predetermining the characteristics of said circuit for alternating current and for automatically and substantially compensating variations in said predetermined characteristics.

18. An electric discharge device having a cathode and an anode, a circuit connecting said cathode and anode including means for predetermining the impedance of said circuit and for automatically and substantially compensating impedance changes in said circuit.

19. An electric discharge device having a cathode and an anode, a circuit connecting said cathode and anode including impedance control means effective over a substantial operating range for substantially compensating impedance variations in said circuit.

20. An electric discharge device having a cathode and an anode, a circuit connecting said cathode and anode including a resistance for predetermining the impedance of said circuit and for automatically and substantially compensating impedance changes in said circuit.

21. An electric discharge amplifier having a cathode and an anode, and an alternating current circuit connecting said cathode and anode including a resistance having a positive temperature coefficient adapted to substantially compensate amplitude variations in the alternating current flowing through said circuit.

22. An electric discharge device having a cathode and an anode, an alternating current circuit connecting said cathode and anode including means responsive to the amplitude of alternating current in said circuit to change its impedance in such manner as to maintain the amplitude of said alternating current at substantially a predetermined value.

In witness whereof, I hereunto subscribe my name this 2nd day of May A. D., 1921. 1921.

WILLIAM S. GORTON.